US005264993A

United States Patent [19]

Neumann et al.

[11] Patent Number: 5,264,993

[45] Date of Patent: Nov. 23, 1993

[54] HEADLAMP FOR POWER VEHICLES

[75] Inventors: Rainer Neumann, Stuttgart; Gerhard Lindae, Leonberg; Kay Kolberg, Ottersweier; Karl-Heinrich Preis, Buehlertal; Thomas Weigold, Baden-Baden, all of Fed. Rep. of Germany

[73] Assignee: Robert Bosch GmbH, Stuttgart, Fed. Rep. of Germany

[21] Appl. No.: 970,091

[22] Filed: Nov. 3, 1992

Related U.S. Application Data

[63] Continuation of Ser. No. 635,472, Dec. 28, 1990, Pat. No. 5,213,406.

[30] Foreign Application Priority Data

Jan. 30, 1990 [DE] Fed. Rep. of Germany ....... 4002576

[51] Int. Cl.[5] .............................................. B60Q 1/04

[52] U.S. Cl. ..................................... 362/61; 362/282; 362/318; 362/325

[58] Field of Search ................... 362/61, 80, 277, 280, 362/282, 284, 297, 298, 263, 304, 322, 324, 346, 321, 318

[56] References Cited

U.S. PATENT DOCUMENTS

| | | | |
|---|---|---|---|
| 1,658,679 | 2/1928 | Hill et al. | 362/284 |
| 4,985,816 | 1/1991 | Seko et al. | 362/303 |
| 5,023,758 | 6/1991 | Allen et al. | 362/61 |

*Primary Examiner*—Stephen F. Husar
*Attorney, Agent, or Firm*—Michael J. Striker

[57] ABSTRACT

A headlamp for a power vehicle comprises a reflector having an apex, a light source arranged in the apex of the reflector, and a dimming device which is formed so that in a position for high beam it allows light from the light source to reach a lower reflector region or allows the light to exit the same, and in a position for low beam it keeps away light from said light source from the lower reflector region or blocks light reflected from the lower reflector region. The light source is formed as a gas discharge lamp with an axial light arc, an upper reflector region is formed for producing a light distribution for low beam while the lower reflector region is formed for producing a light distribution for high beam.

4 Claims, 4 Drawing Sheets

HEADLAMP FOR POWER VEHICLES

This is a continuation of application Ser. No. 07/635,472, filed Dec. 28, 1990, now U.S. Pat. No. 5,213,406.

BACKGROUND OF THE INVENTION

The present invention relates to headlamps for power vehicles.

Headlamps for power vehicles are known in the art in various modifications. One of such headlamps is disclosed for example in the German document DE-OS 1,497,355. This headlamp has a parabolic reflector, and an incandescent lamp with a single incandescent coil inserted in the reflector. Moreover, a shield is provided which partially surrounds the periphery of the incandescent lamp and is movable relative to the incandescent lamp in the optical axis of the reflector. The incandescent lamp is also movable along the optical axis. In the position of low beam the incandescent coil is withdrawn from the focus of the reflector and the shield to a position in which it blocks the light from the light source to an upwardly reflecting region of the reflector. In the position for low beam the incandescent coil is arranged in the region of the focus of the reflector and the shield can reach the position in which the light from the light source is on the whole reflector. Movement of the incandescent coil from the focus of the reflector is necessary to obtain an inclination of the light relative to the roadway, required for the low beam. The switching from the high beam to the low beam and vice versa requires therefore high expenses since the incandescent lamp and the shield must be adjusted. With the parabolic reflector, moreover, neither a favorable light distribution for the low beam nor a favorable light distribution for the high beam is produced.

For simplifying the switching from the high beam to the low beam, also incandescent lamps with two incandescent coils are known. One incandescent coil serves for the low beam and the other incandescent coil serves for the high beam.

Gas-discharge lamps provided for new headlamps have a discharge spark which requires a longer starting time until it reaches the maximum right intensity, as compared with the incandescent lamps. The systems in the low beam and high beam are possible only by an alternating operation of the two light arcs, since here a dark phase is produced until the other light arc reaches its highest light intensity.

SUMMARY OF THE INVENTION

Accordingly, it is an object of the present invention to provide a headlamp which avoids the disadvantages of the prior art.

In keeping with these objects and with others which will become apparent hereinafter, one feature of the present invention resides, briefly stated, in a headlamp in which the light source is formed as a gas-discharge lamp with an axial light arc, the upper reflector region is formed for producing the light distribution for low beam, and the lower reflector region is formed for producing the light distribution for high beam.

When the headlamp is designed in accordance with the present invention, it avoids the disadvantages of the prior art.

In the position of the low beam the upper reflector region and in the position of the high beam the lower reflector region produce favorable light distribution for the low beam and the high beam, respectively, and the gas discharge lamp operates continuously.

According to another feature of the present invention, the lower reflector region has a reflection surface which substantially forms a rotation paraboloid to form its radial outer region with correction parameters of a higher order. In such a construction a favorable light distribution for high beam is obtained.

Still another feature of the present invention is that the upper reflector region has a reflection surface which in horizontal central cross-section has a curve with a focus that is close to the beginning of the light arc at the apex of the reflector, the vertical central section has a curve with a focus spaced from the apex at the beginning of the light arc. This construction of the upper reflector region provides for favorable light distribution for the low beam.

It is still a further feature of the present invention that the axial longitudinal section of the upper reflector region is formed with edge curves and the shield is arranged in a light outlet direction before the lower reflector region, the upper edge of the shield in the position for low beam is formed for formation of bright-dark limit via an objective, and the shield serves as a dimming device. When the diaphragm is used as a dimming device, the dimming device requires only small additional structural features.

In accordance with the present invention the dimming device can be formed as a stationary optical filter composed of an optically non-linear material, which after application of an electrical voltage changes its light permeability and in the position for low beam has lower light permeability and in the position for high beam has higher light permeability. For this construction the dimming device does not have movable parts and has short switching times between the low beam and the high beam.

Further, the power output of the gas discharge lamp in the position for high beam is regulated at a higher value then for the position of low beam. In such a construction a higher light intensity is available for the high beam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
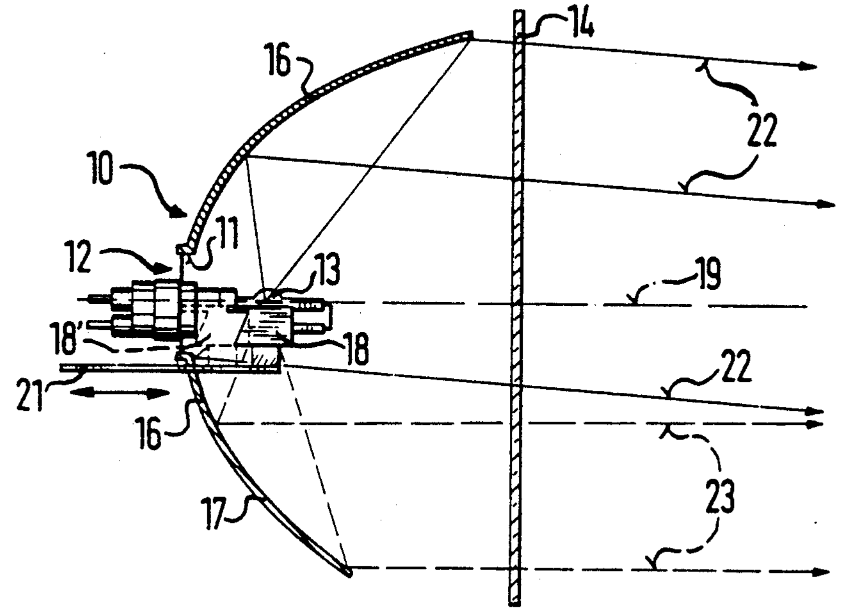
FIG. 1 is a view showing a first embodient of the headlamp in a vertical central section, in accordance with the present invention.

A headlamp for a power vehicle shown in FIG. 1 in accordance with the first embodiment of the invention has a reflector 10 provided with an opening 11. A gas discharged lamp 12 is inserted in the opening 11 in an apex region of the reflector and in operation has an axial light arc 13. The light outlet opening of the reflector is coupled with a light disc 14. The reflector 10 is subdivided underneath the opening 11 into an upper reflector region 16 and a lower reflector region 17. The upper reflector region 16 is formed for producing a favorable light distribution for low beam while the lower reflector region 17 is formed for producing a favorable light distribution for high beam.

The upper reflector region 16 has a reflection surface which in horizontal axial cross-section has a curve with focus located close to the apex of the reflector at the beginning of the light arc 13. In the vertical axial cross-section it has a curve with a focus spaced from the beginning of the light arc 13 to the apex. At the transition from the horizontal axial cross-section to the vertical cross-section the curves are formed whose focal points are located between the focal points of the curves in horizontal and vertical axial cross-section. The curves are substantially, parabolas which however are deformed in the radial outer region of the reflector surface so that a desired light distribution with sharper bright-dark limit for the reflection surface is produced without additional optical means in the light disc 14.

The lower reflector region 17 has a reflection surface which is formed substantially by a rotation paraboloid deformed in its radial outer region with correction parameters of higher order. Therefore approximately rectangular light distribution in accordance with the required law is obtained for the high beam without optical means in the light disc 14.

In the reflector 10 in the region of the gas discharge lamp 12, a substantially U-shaped light impermeable cap 18 is arranged. It is movable along the optical axis 19 of the reflector. An adjusting element 21 of a not shown adjusting device extends into the reflector 10 from its rear side for moving the cap. In the position for low beam the cap 18 blocks the light which is sent by the gas discharge lamp 12 toward the lower reflector regions 19, so that only light from the upper reflector region 16 acts and from the headlamp downwardly inclined light rays 22 of the low beam exit. In a position 18' for high beam shown in FIG. 1 in dashed line, the cap is moved from the position for low beam toward the apex of the reflector 10. Therefore, also light propagates from the gas discharge lamp 12 to the lower reflector region 17 and from the headlamp the horizontal light rays 23 of the low beam extend as shown in broken line in FIG. 1. The movement of the cap 18 by the adjustment element 21 can be performed for example by an electromagnetic adjusting device.

Figure 2:
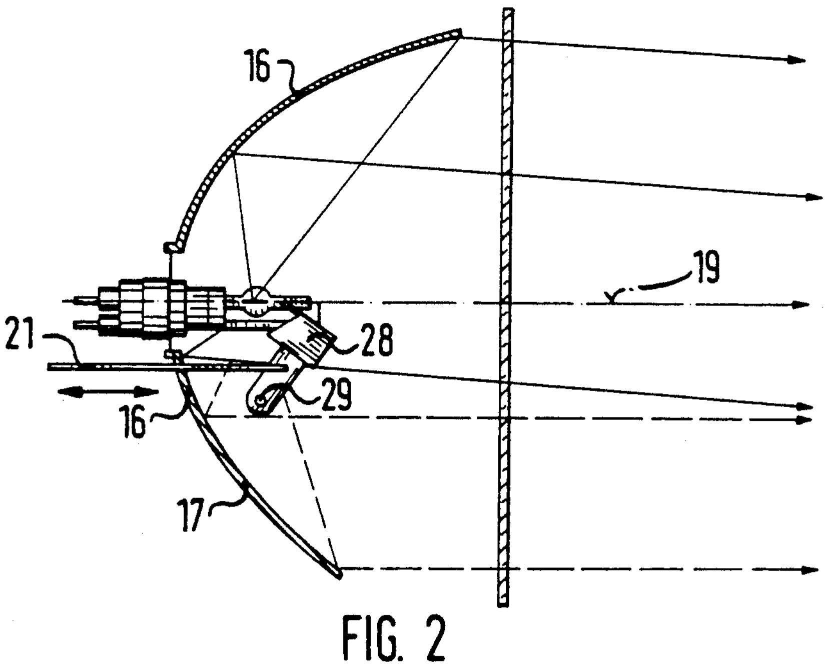
FIG. 2 is a view showing a first modification of the headlamp of FIG. 1.

In the first variant shown in FIG. 2, the cap 28 in deviation from the first embodiment is not axially displaceable. Instead, it is turnable about a horizontal axis extending perpendicularly to the optical axis 19 of the reflector. The adjusting element 21 engages the cap 28 eccentrically to the axis 29 and performs an axial movement for the displacement of the cap 28. The adjustment of the cap 28 for the low beam is described with respect to the first embodiment while the cap 28 in the position for high beam is tilted away from the apex of the reflector 10 forwardly. The advantage of this variant is that for adjusting the cap 28 only small axial movements of the adjusting element 21 are required and therefore a fast adjustment of the cap 28 between the position for low beam and the position for high beam can be obtained.

Figure 3:
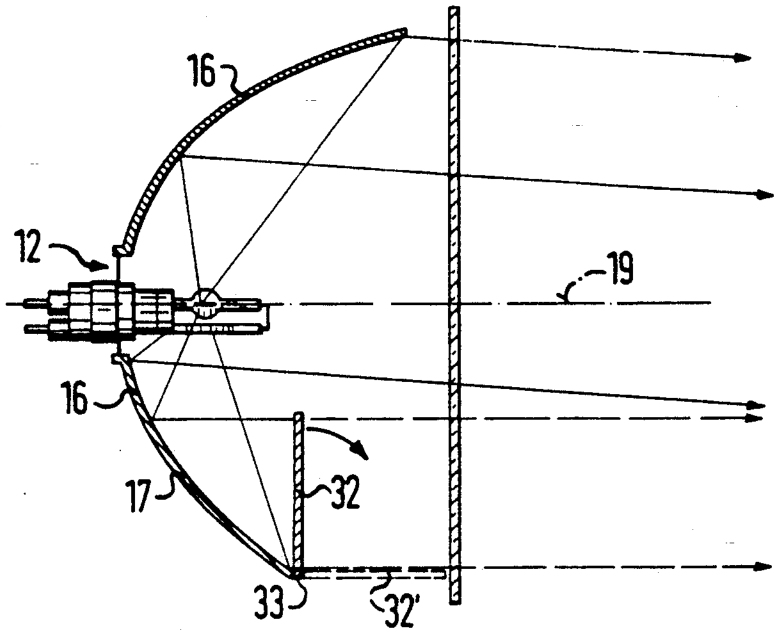
FIG. 3 is a view showing a second modification of the headlamp of FIG. 1.

In the second variant shown in FIG. 3, instead of the cap 18 or 28, a light impermeable flap 32 is arranged before the lower reflector region 17 as considered in the light outlet direction. The flap 32 is turnable about a horizontally arranged axis 33 perpendicularly to the optical axis 19 at the edge of the reflector 10. In the position 32 for low beam, the flap is arranged approximately perpendicularly to the optical axis 19, so that light rays coming from the lower reflector region 17 are blocked. In the position 32' for high beam the flap is tipped forwardly to a substantially horizontal position indicated in a broken line in FIG. 3. Also the light outlet surface of the lower reflector region 17 is released. The movement of the flap 32 described hereinabove can be activated by a centrically arranged adjusting element.

Figure 4:
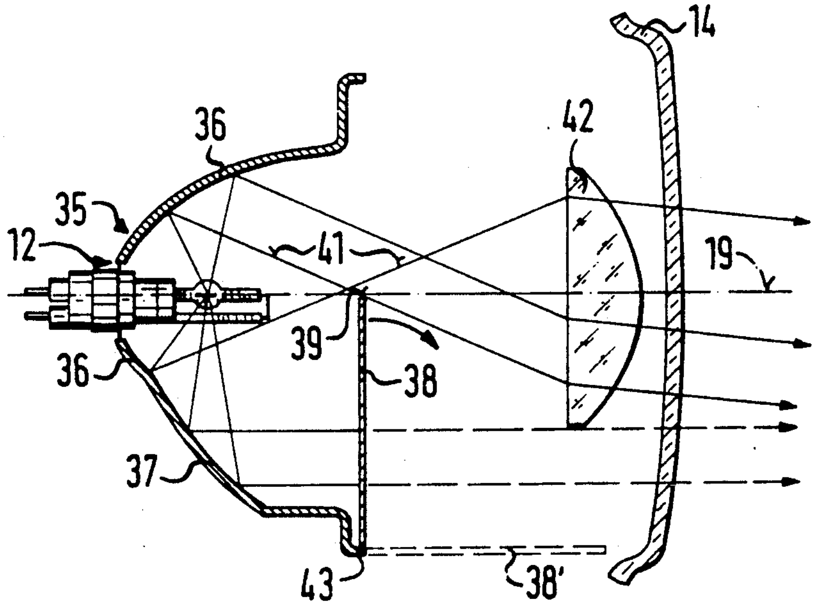
FIG. 4 is a view showing a second embodiment of the headlamp in a vertical central section.

A second embodiment of the headlamp in accordance with a projection principle is shown in FIG. 4. Its reflector 35 as in the first embodiment is subdivided into an upper reflector portion 36 or low beam or a lower reflection portion 37 for high beam. The lower reflector region 37 is formed similarly to that of the first embodiment.

However, contrary to the first embodiment, the upper reflector region 36 has a reflection surface with an axial longitudinal cross-section formed by an ellipsis with different focuses. A light impermeable shield 38 is arranged before the lower reflector region 37. In the position for low beam it blocks the light rays reflected from the lower reflector region 37. The upper edge 39 of the shield 38 is formed so as to provide the bright-dark limit of the light distribution for low beam by light rays 41 reflected from the upper reflector region 36 through an objective 42. The shield 38 is turnable about an axis 43 which is horizontally arranged at the lower reflector edge and extends perpendicularly to the optical axis. In the position for high beam the shield is tilted forwardly to a substantially horizontal position 32' shown in broken line in FIG. 4. In the lower reflector region 37 the light rays 44 are reflected horizontally in a region underneath the objective 42 to form the high beam bundle of the headlamp. The movable shield 38 requires only small additional expenses since in the headlamp in accordance with the projection principle the shield is available and only adjusting possibility for the shield must be provided. The movement of the shield 38 is performed as in the first embodiment by means of an adjusting element which engages the shield 38 eccentrically.

Figure 5:
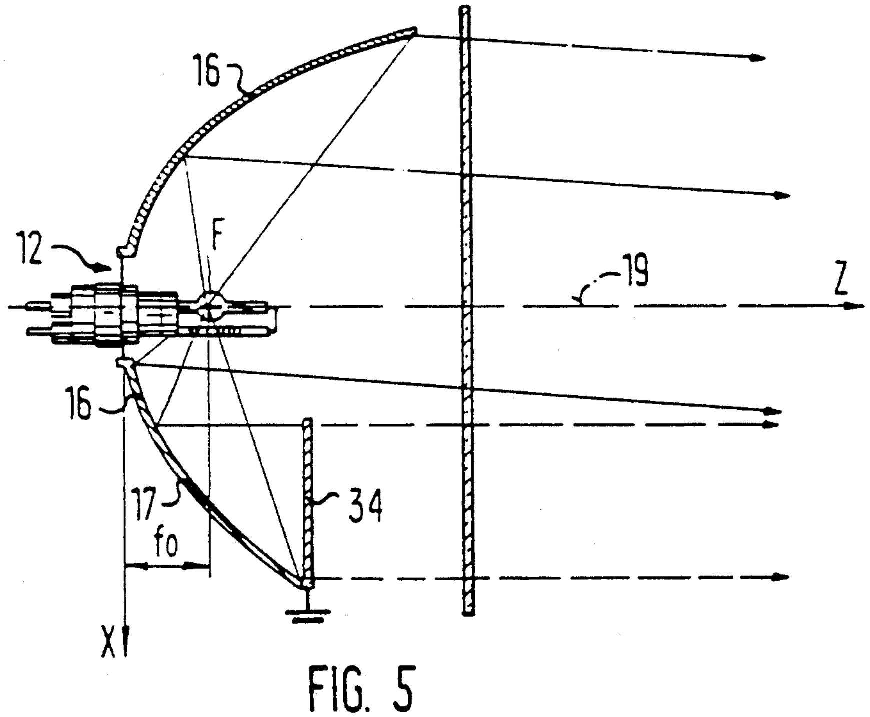
FIG. 5 is a view showing a third embodiment of the headlamp in a vertical central section.

In deviation from the above described, the cap 18, 28 of the headlamp of FIGS. 1 and 2, the flap 32 of the headlamp in FIG. 3, and the shield 38 of the headlamp of FIG. 4 can be formed as a stationary filter 34 composed of an optically non-linear material which changes its permeability in response to application of an electrical voltage as shown in FIG. 5. For the position of low beam, the filter has a lower light permeability and for the position of high beam it has a higher light permeability. Since no mechanical adjustments movements are needed, a short switching time between the low and high beam are provided in such a construction.

For improving the high beam, also the power output of the gas discharge lamp 12 in the position for the high beam can be increased relative to the position for low beam. Therefore, for the high beam a higher light intensity is provided.

Figure 6:
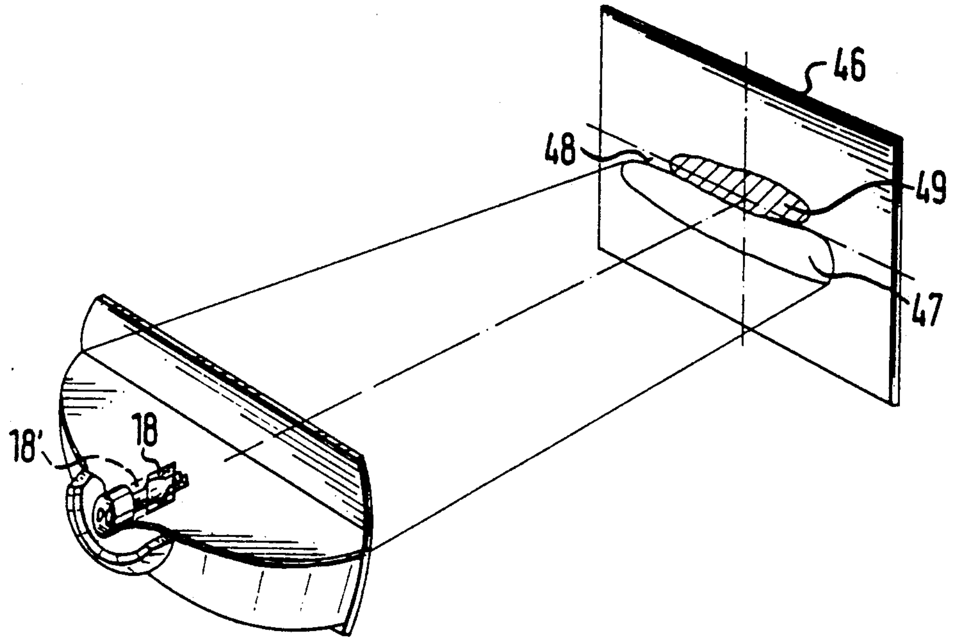
FIG. 6 is a view showing the headlamp of FIG. 1 with a light distribution supplied from the headlamp on a measuring screen.

FIG. 6 shows a measuring screen 46 with a light distribution from the headlamp of FIG. 1. The low beam bundle 47 is obtained with the bright-dark limit 48 when the flap 18 is shown in the position 18 identified with a solid line. In the position 18' shown in a broken line additionally above the upper part of the bright-dark limit 48, the high beam bundle 49 is produced.

It will be understood that each of the elements described above, or two or more together, may also find a useful application in other types of constructions differing from the types described above.

While the invention has been illustrated and described as embodied in a headlamp for power vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlamp for a power vehicle, comprising a reflector having an apex; a light source arranged in said apex of said reflector; and a dimming device which is formed so that in a position for high beam it allows light being reflected by a lower region of said reflector to exit the same, and in a position for low beam blocks light being reflected by said lower reflector region, said light source being formed as a gas discharge lamp with an axial light arc, an upper reflector region being formed for producing a light distribution for a low beam while the lower reflector region being formed for producing a light distribution for high beam, said lower reflector region having a surface which in the region of the apex is defined by a paraboloid of revolution and which is deformed in a radial outer region to obtain an approximately rectangular light distribution for high beam.

2. A headlamp as defined in claim 1, wherein said dimming device is formed as a flap arranged before the lower reflector region so that in the position for low beam it blocks light reflected from the lower reflector region.

3. A headlamp as defined in claim 1, wherein the upper reflector region has axial longitudinal cross-sections with edge curves formed as ellipses, and further comprising a shield located before the lower reflector region and having an upper edge which in the position for low beam forms a bright-dark limit through an objective, said shield being operable as said dimming device.

4. A headlamp as defined in claim 1, wherein said dimming device is formed as a stationary optical filter composed of an optically non-linear material such that by applying an electrical voltage its light permeability changes to form a lower light permeability in the position for low beam and a higher light permeability in the position for high beam.

* * * * *